United States Patent [19]
Arnaud et al.

[11] Patent Number: 6,153,024
[45] Date of Patent: Nov. 28, 2000

[54] WIRE STOCK SUITABLE FOR REINFORCEMENT

[75] Inventors: Jean-Claude Arnaud, Durtol; Eric Depraetere, Thuret; Raoul Serre, Ceyrat; Marc Francois, Metz, all of France

[73] Assignee: Ispat-Unimetal, Rombas, France

[21] Appl. No.: 09/091,844

[22] PCT Filed: Jan. 8, 1997

[86] PCT No.: PCT/FR97/00027

§ 371 Date: Dec. 4, 1998

§ 102(e) Date: Dec. 4, 1998

[87] PCT Pub. No.: WO97/26385

PCT Pub. Date: Jul. 24, 1997

[30] Foreign Application Priority Data

Jan. 16, 1996 [FR] France ................................. 96 00407

[51] Int. Cl.[7] .............................. C22C 38/22; C22C 38/18
[52] U.S. Cl. .......................... 148/333; 148/334; 420/100; 420/101; 420/104; 420/105
[58] Field of Search ..................................... 148/333, 334; 420/100, 101, 104, 105

[56] References Cited

U.S. PATENT DOCUMENTS 5,229,069  7/1993  Shemenski et al. ..................... 420/104

FOREIGN PATENT DOCUMENTS

| 058 016 | 8/1982 | European Pat. Off. . |
| 509 407 | 10/1992 | European Pat. Off. . |
| 55-147416 | 11/1980 | Japan . |
| 02-129342 | 5/1990 | Japan . |
| 3-162550 | 7/1991 | Japan . |
| 03-162550 | 10/1991 | Japan . |

*Primary Examiner*—Daniel J. Jenkins
*Assistant Examiner*—Nicole Coy
*Attorney, Agent, or Firm*—Nixon Peabody LLP; Thomas W. Cole

[57] ABSTRACT

This wire stock is made of a microalloyed steel having a carbon content of between 0.2% and 0.6% by weight and furthermore containing at least one alloying element selected from the group consisting of vanadium, molybdenum and chromium, in a proportion, by weight, of at least 0.05% and at most 0.5% of said alloying element or of the combination of said alloying elements. Such wire stocks are manufactured in order to produce, by deformation and heat treatment, a ready-to-use wire which is used, for example, to reinforce articles made of plastics or made of rubber, especially tire covers, plies, belts, hoses.

5 Claims, No Drawings

WIRE STOCK SUITABLE FOR REINFORCEMENT

FIELD OF THE INVENTION

The invention relates to steel wire stocks making it possible to obtain ready-to-use wires which can be used to reinforce articles, made of plastics or made of rubber, especially tire covers, plies, belts, hoses, etc.

The expression "ready-to-use wire" is employed here in its usual assertion in the metallurgy field, namely that this wire can be used, for the intended application, without having to subject it beforehand to a heat treatment capable of altering its metallurgical structure and without deforming it, for example in a wire-drawing operation capable of altering its diameter.

PRIOR ART

International Patent Application WO-A-92/14811 describes a process for obtaining a "ready-to-use" wire of this type, which comprises a steel substrate whose structure comprises, by weight, more than 90% work-hardened tempered martensite, the steel having a carbon content at least equal to 0.05% and at most equal to 0.6%, this substrate being coated with a metal alloy other than steel, for example brass. The process for obtaining this wire includes a quenching treatment on work-hardened wire by heating the wire above the $AC_3$ transformation point in order to give it a homogeneous austenitic structure and then by rapidly cooling it to below the martensite transformation finish point at a rate at least equal to 150° C./second. After this quenching treatment, at least two metals are deposited on the wire, then the wire is heated to form, by diffusion, an alloy of these metals, generally brass, and then the wire is subsequently cooled and work-hardened.

The process described in this document has, in particular, the following advantages:

the use of an initial wire stock having a carbon content less than that of a pearlitic steel, a great flexibility in the choice of diameters of the wire stock and of the ready-to-use wires thus obtained, the wire drawing is carried out on the wire stock at high rates and with fewer breakages, and the diffusion treatment is carried out at the same time as tempering the wire, which reduces the manufacturing costs.

However, this known process has the following drawbacks:

a) the tempering temperature necessary for obtaining good diffusion of the coating does not always correspond specifically to that necessary for obtaining sufficient mechanical strength before wire drawing;

b) the mechanical properties obtained after tempering vary rapidly with the temperature variations introduced as a result of the inevitable dispersion in the heating systems; and c) the steel proves to be insufficiently hardenable, that is to say that it is necessary to cool at a high rate in order to obtain a completely, or almost completely, martensitic structure. If the cooling rate is too low, phases other than martensite may appear, such as bainite for example. This high quench rate is a major manufacturing constraint.

It is known in general that, in processes for producing components made of martensitic steels, the addition of an alloying element, such as vanadium or chromium, makes it possible to improve the hardenability and the strength as the result of the precipitation of vanadium or chromium carbonitrides and/or carbides during the tempering. However, the usual treatment times for allowing precipitation are several tens of minutes, or even several hours.

The Applicant has completely unexpectedly found that the precipitation, in the form of carbonitrides and/or carbides, of an alloying element such as vanadium, molybdenum or chromium could take place rapidly in wires having a diameter smaller than 3 mm. This precipitation during tempering makes it possible to avoid the aforementioned drawbacks a) and b) and the presence of these alloying elements during the quench makes it possible to avoid the aforementioned drawback c), thereby making a softer quench possible.

SUMMARY OF THE INVENTION

Thus, the subject of the invention is a wire stock intended to obtain, by deformation and heat treatment, a ready-to-use wire, this wire stock being distinguished by the fact that it is made of a microalloyed steel having a carbon content, by weight, of between 0.2% and 0.6%, the steel furthermore containing at least one alloying element selected from the group consisting of vanadium, molybdenum and chromium, the steel containing at least 0.05% and at most 0.5% by weight of the alloying element or of the combination of alloying elements.

The "ready-to-use" wire obtained from the wire stock according to the invention has the following characteristics:

a) it is made of a microalloyed steel having a carbon content at least equal to 0.2% and at most equal to 0.6% by weight. This steel furthermore contains at least one alloying element selected from the group consisting of vanadium, molybdenum and chromium, in an amount of at least 0.05% and at most 0.5% by weight of the alloying element or of the combination of alloying elements;

b) this steel has a structure consisting almost entirely of work-hardened tempered martensite;

c) the diameter of the wire is at least equal to 0.10 mm and at most equal to 0.50 mm; and d) the tensile strength of the wire is at least equal to 2800 MPa.

Preferably, the "ready-to-use" wire includes a coating of a metal alloy other than steel, placed on a substrate made of a microalloyed steel having the aforementioned characteristics.

A process for producing such a "ready-to-use" wire comprises the following operations:

a) a wire stock according to the invention is taken;

b) this wire stock is deformed in such a way that the diameter of the wire after this deformation is less than 3 mm;

c) the deformation is stopped and a quenching heat treatment is carried out on the deformed wire, this treatment consisting in heating the wire to above the $AC_3$ transformation point in order to give it a homogeneous austenitic structure and then in cooling it to at least almost the martensite transformation finish point $M_F$, the rate of this cooling being at least equal to 60° C./s so as to obtain a structure consisting almost only of martensite;

d) next, the wire is heated to a temperature, called the "tempering temperature", at least equal to 250° C. and at most equal to 700° C., so as to precipitate at least one carbonitride and/or carbide of the alloying element, or of at least one alloying element, and to form a structure consisting almost entirely of tempered martensite;

e) next, the wire is cooled at least almost down to the martensite transformation finish point M>; and f) the wire is then deformed, the deformation ratio ε being at least equal to 1.

Preferably, after step c), defined above, at least two metals capable of forming an alloy by diffusion are deposited on the wire, the aforementioned microalloyed steel thus serving as substrate, and during step d) defined above, the wire is heated to the tempering temperature, the heating also serving to form carbide diffusion, an alloy of these metals, for example, brass.

The "ready-to-use" wires thus obtained may be used as they are. It is also possible to form assemblies with them, for example strands or cables consisting of wires, especially cables consisting of layers of wires or cables consisting of strands of wires.

These "ready-to-use" wires, or the assemblies of such wires, may be used to reinforce articles which are, for example, tire covers, plies, belts or hoses.

DESCRIPTION OF THE PREFERRED EMBODIMENTS

The invention will be readily understood with the aid of the following embodiments.

I. DEFINITIONS AND TESTS

1. Tensile-test measurements: These tensile strength measurements are carried out in tension according to the method described in French Standard AFNOR NF A 03-151 of June 1978.

2. Deformation: by definition, the deformation is expressed by its deformation ratio ε, this being given by the formula:

$$\epsilon = \ln(S_o/S_f)$$

ln being the natural logarithm, $S_o$ being the initial cross section of the wire before this deformation and $S_f$ being the cross section of the wire after this deformation.

3. Structure of the steels: the structure of the steels is determined visually using an optical microscope with a magnification of 400. The preparation of the samples, by etching, and the examination of the structures are carried out in accordance with the following reference: De Ferri Metallographica, Vol. No. II, A. Schrader and A. Pose, published by Verlag Stahleisen GmbH, Düsseldorf.

4. Determination of the $M_F$ point: the martensite transformation finish point $M_F$ is determined in accordance with the following reference: Ferrous Physical Metallurgy, A. Kumar Sinhu, published by Butterworths 1989. For this purpose, the following equation is used: $M_F = M_S - 215°$ C.

with: $M_S = 539 - 423 \times C\% - 30.4 \times Mn\% - 17.7 \times Ni\% - 12.1 \times Cr\% - 7.5 \times Mo\% - 7.5 \times Si\% + 10 \times Co\%$, in which C %, Mn %, Nil, Cr %, Mo %, Si % and Co % represent the percentages by weight of the chemical substances for which they are the symbols.

It is accepted that vanadium may be used in his formula as it has the same effect as molybdenum (although the aforementioned reference representative of the prior art does not mention vanadium).

5. Vickers hardness: this hardness, as well as the method for determining it, are described in French Standard AFNOR A 03-154.

6. Diffusion rate of brass: this rate is determined by X-ray diffraction using a cobalt anode (30 kV, 30 mA) The area of the peaks corresponding to the α and β phases (pure copper being defined as being coincident with the β phase) are measured after the two peaks have been deconvoluted. The diffusion rate $T_d$ is given by the formula:

$T_d$=(area of the α peak)/(area of the α peak+area of the β peak).

The α peak corresponds approximately to an angle of 50° and the β peak corresponds approximately to an angle of 51°.

II) EXAMPLES

Four 5.5 mm diameter wire stocks, referenced A, B, C, and D, are used, wire stocks C and D being according to the invention. The composition by weight of the steel of these wire stocks is given in Table 1 below:

TABLE 1

|  | C% | Mn% | Si% | V% | S% | P% |
| --- | --- | --- | --- | --- | --- | --- |
| Wire stocks A, B | 0.427 | 0.619 | 0.222 | 0 | <0.003 | <0.003 |
| Wire stock C | 0.428 | 0.621 | 0.224 | 0.103 | <0.003 | <0.003 |
| Wire stock D | 0.419 | 0.611 | 0.222 | 0.156 | <0.003 | <0.003 |

The other elements in these wire stocks are in the state of the inevitable impurities and in negligible quantities.

The values of $M_F$ and $AC_3$ for these wire stocks are given in Table 2.

TABLE 2

|  | $M_F$ | $AC_3$ |
| --- | --- | --- |
| Wire stocks A and B | 123° C. | 769° C. |
| Wire stock C | 122° C. | 779° C. |
| Wire Stock D | 125° C. | 786° C. |

The values of $AC_3$ in degrees Celsius are given by the following formula from Andrews (JISI, July 1967, pages 721–727):

$AC_3$=910–203 C %–15.2 Ni %+44.7 Si %+104 V %+31.5 Mo %–30. Mn %+13.1 W %–20 Cu %+700 P %+400 Al %+120 As %+400 Ti % in which C %, Ni %, Si %, V %, Mo %, Mn %, W %, Cu %, P %, Al %, As % and Ti % represent the percentages by weight of the chemical substances of which they are the symbols.

Wire stocks A and B are therefore identical and not microalloyed, wire stocks C and D being microalloyed and different from each other.

These wire stocks are drawn down to a diameter of 1.3 mm, the deformation ratio ε thus being equal to 2.88.

Next, a quenching treatment is carried out on these four wires in the following manner:

heating to 1000° C. and holding for 5 seconds;

rapidly cooling down to ambient temperature (approximately 20° C.).

The quench cooling conditions are as follows:

Wires A, C and D: quench rate 130° C./s, using a mixture of hydrogen and nitrogen (75% hydrogen by volume, 25% nitrogen by volume) as the quench gas;

Wire B: quench rate 180° C./s, using pure hydrogen.

The Vickers hardness on each of the wires obtained, referenced A1, B1, C1 and D1, are measured, the letters A, B, C and D each identifying the aforementioned initial wire stock. The values obtained are given in Table 3.

TABLE 3

| Wire A1 | Wire B1 | Wire C1 | Wire D1 |
|---------|---------|---------|---------|
| 650     | 685     | 690     | 700     |

Wire A1 is unusable since its hardness is too low, this being due to the fact that its structure does not consist almost exclusively of martensite but contains both martensite and bainite.

Wires B1, C1 and D1 each consist almost exclusively of martensite and their Vickers hardness is satisfactory.

Wires C1 and D1, made of microalloyed steel, are obtained with a quench which is easy to perform (relatively low rate using a gas mixture which is inexpensive and not dangerous), while wire B1 is obtained using a difficult and expensive process (high quench rate using pure hydrogen), this process making it possible to obtain a hardness which is high enough but which is, however, less than that of the microalloyed wires C1 and D1.

It may therefore be seen that vanadium improves the hardenability of the steel, that is to say the formation of a single martensite phase during the quench.

Next, a layer of copper and then a layer of zinc are deposited on the three wires B1, C1 and D1 in a known manner, for example by electrolysis. The total quantity of the two metals deposited is 390 g per 100 g of each of the wires, with 64% by weight of copper and 36% by weight of zinc. The three wires B2, C2 and D2 are thus obtained.

Next, reference wire B2 is heated, by the Joule effect, for 5 seconds, each time at three tempering temperatures $T_r$(525° C., 590° C. and 670° C.), and then the wire is cooled to ambient temperature (approximately 20° C.) so as to determine the effect of this heat treatment on the tensile strength $R_m$ and on the brass diffusion rate $T_d$, the brass being formed by the alloying of the copper and zinc, in each case for the wire thus obtained, B3.

The results are given in Table 4.

TABLE 4

| $T_r$    | $R_m$ (MPa) | $T_d$ |
|----------|-------------|-------|
| 525° C.  | 1239        | 0.82  |
| 590° C.  | 1120        | 0.92  |
| 670° C.  | 964         | 0.95  |

It should be pointed out that, in the case of the 525° C. temperature, the diffusion rate $T_d$ is insufficient (less than 0.85) but that the tensile strength is higher than for the other temperatures. Very good diffusion of the brass is obtained for the 670° C. treatment (diffusion rate greater than 0.85) but the tensile strength is appreciably lower than at 525° C. and is insufficient to allow a high tensile strength to be obtained by a subsequent drawing operation. In the case of the 590° C. treatment, the tensile strength is slightly greater than that obtained at 670° C., with a slightly lower, although satisfactory, brass diffusion rate, but this strength is also insufficient to guarantee a high post-drawing strength.

It may also be seen that the diffusion rate increases when the tensile strength decreases, which is a drawback since, in practice, the diffusion rate must be higher the higher the tensile strength in order to allow subsequent deformation (for example, by drawing) without the wire breaking. On the contrary, it is observed here that the deformability decreases when the tensile strength increases, which is the opposite way to the desired objective.

The two wires C2 and D2, containing vanadium, are heated to 590° C. for only 5 seconds, in order to temper them, and then cooled to ambient temperature (approximately 20° C.). Next, the diffusion rate $T_d$ of the brass and the tensile strength $R_m$ of the wires thus obtained, C3 and D3, are determined. The results are given in Table 5.

TABLE 5

|         | $R_m$ (MPa) | $T_d$ |
|---------|-------------|-------|
| Wire C3 | 1229        | 0.92  |
| Wire D3 | 1261        | 0.92  |

In both cases it may be seen that the brass diffusion rate is greater than 0.9, that is to say that the diffusion is very good, and that the tensile strength is also very good, greater than that obtained on reference wire B3 when the brass diffusion rate is greater than 0.9. The presence of vanadium therefore makes it possible, unexpectedly, to have both a good brass diffusion rate and a good tensile strength by virtue of the formation of fine vanadium carbonitride and/or carbide precipitates, which vanadium was in solution after the quench period, this being so despite the very short tempering time.

It is known that vanadium precipitates in steels for very long tempering times, ranging from approximately ten minutes to several hours, but it is surprising to observe such precipitation for such short times of less than one minute, for example less than 10 seconds.

Next, wires B3, C3 and D3 are deformed by drawing in order to obtain a final diameter of approximately 0.18 mm, which corresponds to a —deformation ratio $\epsilon$ of 4, and ready-to-use wires B4, C4 and D4 are thus obtained, the tensile strength $R_m$ of which is determined. The results are given in Table 6.

TABLE 6

|    | $T_r$    | $R_m$ (MPa) | $T_d$ |
|----|----------|-------------|-------|
| B4 | 525° C.  | 2960        | 0.82  |
| B4 | 590° C.  | 2820        | 0.92  |
| B4 | 670° C.  | 2530        | 0.95  |
| C4 | 590° C.  | 2945        | 0.92  |
| D4 | 590° C.  | 2983        | 0.92  |

The $T_r$ values are those indicated previously for the tempering and the $T_d$ values are those indicated previously and which were determined after the brass-forming operation, before drawing, the To values hardly being altered by drawing.

It may be seen that wires C4 and D4 are distinguished both by a good brass diffusion rate (greater than 0.9) and by an excellent tensile strength (greater than 2900 MPa). Reference wires B4 have tensile strength values appreciably less than those of wires C4 and D4, apart from wire B4 which was initially treated at a tempering temperature of 525° C., while the brass diffusion rate is insufficient (less than 0.85), that is to say that the drawing operation is difficult to perform and leads to the wire breaking frequently during its deformation, thereby making it much more difficult to obtain the wire than in the case of wires C4 and D4.

The above examples used a vanadium steel, but the invention also applies to cases in which at least one of the metals molybdenum and chromium is used and to cases in which at least two of the metals selected from the group consisting of vanadium, molybdenum and chromium are used.

The wire stock according to the invention is produced in the usual way for a wire stock intended to be converted into fine "ready-to-use" wire for reinforcing tire covers.

The production starts with a bath of molten steel having the composition indicated for the wire stock according to the invention. This steel is firstly smelted in an electric furnace or in an oxygen converter and is then deoxidized in a ladle using an oxidizing agent such as silicon, which does not run the risk of producing alumina inclusions. Next, vanadium is introduced into the ladle in the form of loose pieces of ferro-vanadium by adding them to the metal bath.

This situation remains valid if the alloying element has to be chromium or molybdenum.

Once the bath of steel is ready, it is cast continuously into billets or blooms. These semi-finished products are then conventionally rolled into wire stock having a diameter of 5.5 mm, by firstly rolling them into billets if the castings are blooms, or directly into wire stock if the castings are billets.

Preferably, the wire stock according to the invention has at least one of the following characteristics:

the carbon content is at least equal to 0.3% and at most equal to 0.5% (% by weight), this content being advantageously approximately 0.4%;

the steel satisfies the following relationships: $0.3\% \leq Mn \leq 0.6\%$; $0.1\% \leq Si \leq 0.3\%$; $P \leq 0.02\%$; $S \leq 0.02\%$ (% by weight);

the alloying element, or the combination of alloying elements, represents at most 0.3% by weight of the steel.

Preferably, the "ready-to-use" wire obtained from the wire stock according to the invention has the following characteristics:

the tensile strength is at least equal to 2900 MPa;

the diameter is at least equal to 0.15 mm and at most equal to 0.40 mm.

Preferably, the process for converting the wire stock according to the invention, so as to obtain the aforementioned "ready-to-use" wire, has at least one of the following characteristics:

the carbon content of the steel of the wire stock used is at least equal to 0.3% and at most equal to 0.5% (% by weight), this value being, for example, approximately 0.4%;

the steel of the machine stock used satisfies the following relationships:

$0.3\% \leq Mn \leq 0.6\%$; $0.1\% \leq Si \leq 0.3\%$; $P \leq 0.02\%$; $S \leq 0.02\%$ (% by weight);

the alloying element or the combination of alloying elements of the steel of the wire stock used represents at most 0.3% by weight of this steel;

the cooling rate during the quench is less than 150° C./second;

the tempering temperature is at least equal 400° C. and at most equal to 650° C.;

the wire stock is cooled to ambient temperature after having heated it to the tempering temperature;

the degree of deformation $\epsilon$ after the tempering treatment is at least equal to 3.

The deformation of the wire stock in the above examples was carried out by drawing, but other techniques are possible, for example by rolling, optionally combined with drawing, at least for one of the deformation operations.

Of course, the invention is not limited to the embodiments described above. Thus, for example, the wire stock according to the invention may serve for producing a "ready-to-use" wire whose steel substrate is coated with an alloy other than brass, this alloy being obtained from two metals, or from more than two metals, for example (copper—zinc—nickel), (copper—zinc—cobalt) or (copper—zinc—tin) ternary alloys, the essential point being that the metals used must be capable of forming an alloy, by diffusion, without having to exceed the annealing temperature.

What is claimed is:

1. A wire stock for reinforcing elastomeric articles after said wire stock has been deformed and heat treated, which wire stock comprises a microalloyed steel having a carbon content, by weight, of between 0.2% and 0.6%, the steel containing at least one alloying element selected from the group consisting of vanadium, molybdenum and chromium, in a proportion of at least 0.05% and at most 0.5% by weight of said alloying element or of the combination of said alloying elements, the steel also satisfying the following relationships: $0.3\% \leq Mn \leq 0.6\%$; $0.1\% \leq Si \leq 0.3\%$; $P \leq 0.02\%$; $S \leq 0.02\%$ (% by weight), said steel being heat treated and mechanically deformed to impart a martensitic microstructure to wire stock formed therefrom.

2. The wire stock as claimed in claim 1, wherein said carbon content by weight is between 0.3% and 0.5%.

3. The wire stock as claimed in claim 2, wherein said carbon content is approximately 0.4% by weight.

4. Wire stock according to claim 1, wherein the alloying element, or the combination of alloying elements, represents at most 0.3% by weight of the steel of which it comprises.

5. A wire stock for reinforcing elastomeric articles after said wire stock has been deformed and heat treated, which wire stock comprises a microalloyed steel having a carbon content, by weight, of between 0.2% and 0.6%, the steel containing at least one alloying element selected from the group consisting of vanadium, molybdenum and chromium, in a proportion of at least 0.05% and at most 0.5% by weight of said alloying element or the combination of said alloying elements, said steel being heat treated and mechanically deformed to impart a martensitic microstructure to wire stock formed therefrom.

* * * * *